United States Patent

Iwata

[11] Patent Number: 5,845,209
[45] Date of Patent: Dec. 1, 1998

[54] MOBILE COMMUNICATIONS SYSTEM

[75] Inventor: Yasuharu Iwata, Kawasaki, Japan

[73] Assignee: Fujitsu Limited, Kanagawa, Japan

[21] Appl. No.: 688,805

[22] Filed: Jul. 31, 1996

[30] Foreign Application Priority Data

Nov. 24, 1995 [JP] Japan .................................. 7-305307

[51] Int. Cl.⁶ .................................................. H04Q 7/20
[52] U.S. Cl. ........................ 455/423; 455/67.1; 455/67.3; 455/63
[58] Field of Search ................................. 455/67.1, 67.3, 455/67.4, 67.7, 62, 65, 422, 423, 424, 425, 63, 524, 9

[56] References Cited

U.S. PATENT DOCUMENTS

| | | | |
|---|---|---|---|
| 5,139,769 | 8/1992 | Grube et al. | 455/509 |
| 5,142,694 | 8/1992 | Jackson et al. | 455/67.1 |
| 5,555,192 | 9/1996 | Grube et al. | 364/541 R |
| 5,603,093 | 2/1997 | Yoshimi et al. | 455/63 |
| 5,649,303 | 7/1997 | Hess | 455/63 |

FOREIGN PATENT DOCUMENTS 3-89636   4/1991   Japan .

Primary Examiner—Nguyen Vo
Assistant Examiner—Darnell R. Armstrong
Attorney, Agent, or Firm—Helfgott & Karas, PC

[57] ABSTRACT

A mobile radio communications system which keeps operational even when the signal reception conditions deteriorate due to interference. Mobile stations in the system communicate through radio communication channels via a base station. A plurality of interference monitor stations are fixedly placed in the service zone of the base station. The interference monitor stations, being wired to the base station via telecommunications lines, constantly monitors transmission signals sent from the base station. A reception condition monitoring unit watches the reception conditions of the transmission signals to detect interference. If any interference is detected, an interference detection signal output unit sends an interference detection signal to the base station via the telecommunications lines. Upon reception of the interference detection signal, a carrier switching controller forces a carrier of the transmission signal to be switched to another carrier after confirming predefined conditions.

8 Claims, 18 Drawing Sheets

MOBILE COMMUNICATIONS SYSTEM

BACKGROUND OF THE INVENTION

1. Field of the Invention

The present invention relates to a mobile communications system in which mobile stations can receive control signals through a control channel at any time, and more specifically, to a digital mobile communications system using time-division multiplexer (TDM) and time-division multiple access (TDMA) techniques.

2. Description of the Related Art

In TDM/TDMA digital communications systems, each carrier is formatted so as to convey a plurality of frames having a constant time length, and each frame is subdivided into a plurality of slots as many as the number of multiplexed channels. Radio communication channels are formed by concatenating discrete slots located at a fixed slot position in contiguous frames.

At least one of such radio communication channels is assigned as a control channel and the rest are used as speech channels. The control channel carries control signals for governing transmission and reception of main signals conveyed over the speech channels. Receiving the control signals sent from a base station, mobile stations establish synchronization with the channel switching timing according to the TDMA scheme and then select their respective speech channels as specified by the control signals, thus enabling multi-channel communications using a single TDMA carrier.

In some radio communications systems such as personal digital cellular (PDC) systems that must deal with a heavy data traffic, a plurality of TDMA carriers having different frequencies are provided to ensure enough capacity. For the purpose of interference detection, color code signals are transferred over the control channel of each carrier. Before starting a call, a mobile station receives the color code signals, switching from one carrier to another, and compares reception conditions of the color code signals received in different carriers. The mobile station then selects a carrier exhibiting the most excellent reception condition and starts sending and receiving main signals using one of the speech channels available in the selected carrier. During the call, the mobile station still keeps monitoring the reception condition of the color code signals sent through a control channel of the carrier in use. If any signal degradation due to some interference is found during this monitoring operation, the mobile station will report the situation of interference to a control station via a base station, using another carrier that is still healthy. In response to the report, the control station selects another non-interfered carrier and notifies the base and mobile stations of assignment of the new carrier, thus prompting them to use it instead the interfered carrier.

On the other hand, there is another type of mobile radio system, in which mobile stations are only allowed to use a predetermined single carrier for communication, as opposed to the above-described system where the mobile stations have a plurality of carriers to check and use. When any interference has occurred in the only carrier, the system will be unable to continue its operation because the mobile station has no way to inform its corresponding base station of the problem of interference.

There is a similar problem also in the first-described multiple carrier system. Since its control channel is assigned to a fixed carrier, the system will lose the path to the base station and thus it must stop its operation if the interference has just attacked the carrier containing the control channel.

SUMMARY OF THE INVENTION

Taking the above into consideration, an object of the present invention is to provide a mobile communications system that will keep operational even when the signal reception conditions deteriorate, which is applicable to a single-carrier system operating with a single carrier for communications or a multiple-carrier system with a control channel fixed to a specific carrier.

To accomplish the above object, according to the present invention, there is provided a mobile communications system in which mobile stations communicate through radio transmission channels via a base station.

The system comprises a plurality of interference monitor stations, disposed in a service zone under control of the base station, for detecting interference affecting a transmission signal sent from the base station, and carrier switching control means for making a first carrier, which has been used for conveying the transmission signal, switched to a second carrier, upon detection of interference by at least one of the plurality of interference monitor stations.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the accompanying drawings.

At the outset, the concept of the present invention will be presented below, using FIG. 1 for reference. According to the present invention, a plurality of interference monitor stations 2–9 are distributed within a service zone under the control of a base station 1 so as to detect interference that may affect the transmission signal sent from the base station 1. Upon detection of interference by any of the interference monitor stations 2–9, carrier switching control means 10 forces a carrier currently used for the transmission signal to be switched to another carrier. Each of the interference monitor stations 2–9 is equipped with reception condition monitoring means 2a and interference detection signal output means 2b. The reception condition monitoring means 2a monitors the transmission signal from the base station 1 to detect any interference therewith. When the interference is detected by the reception condition monitoring means 2a, the interference detection signal output means 2b sends an interference detection signal to the base station 1.

Further detailed configuration will be now described below with reference to FIGS. 2–6, and after that, the correspondence between this detailed structure and the basic structure shown in FIG. 1 will be clarified.

Figure 2:
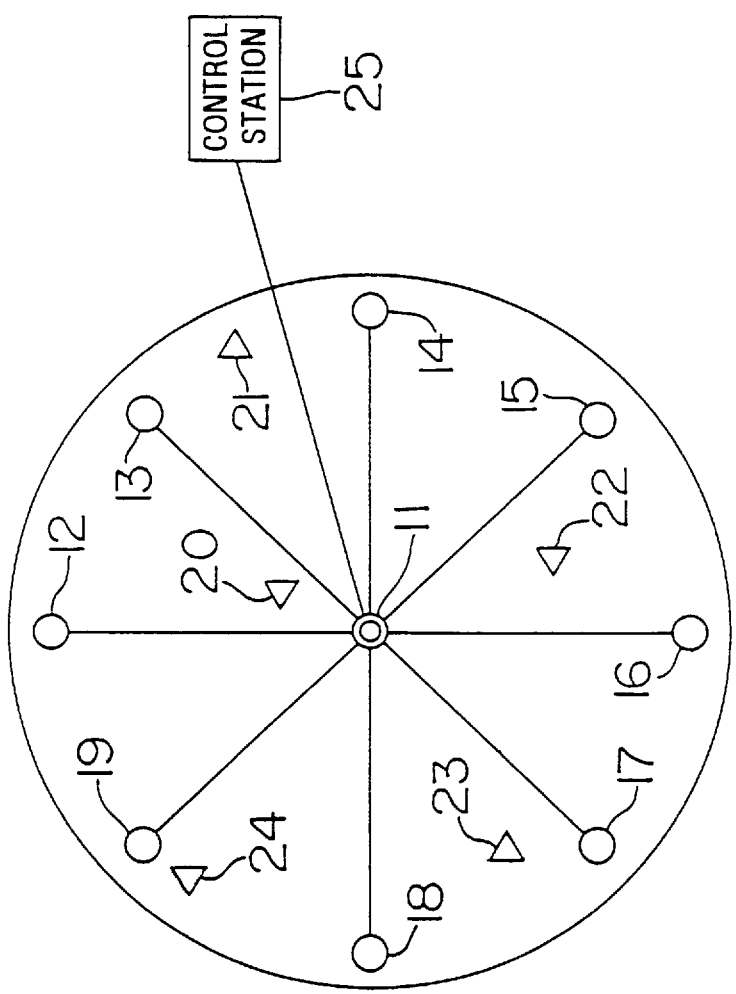
FIG. 2 is a diagram schematically showing a service zone covered by a base station.

FIG. 2 is a diagram schematically showing a service zone covered by a base station. Interference monitor stations 12–19 are fixedly arranged in the service zone of a base station 11 so that the interference will be observed at various points in the service zone. For example, when the shape of the service area is a simple circle, the interference monitor stations 12–19 are distributed at even distances along the circumference where the field strength is relatively low. The interference monitor stations 12–19 are wired to the base station 11 and the base station 11 is wired to a control station 25 with cable communication networks. Mobile stations 20–24 can freely move in such a service zone.

Figure 3:
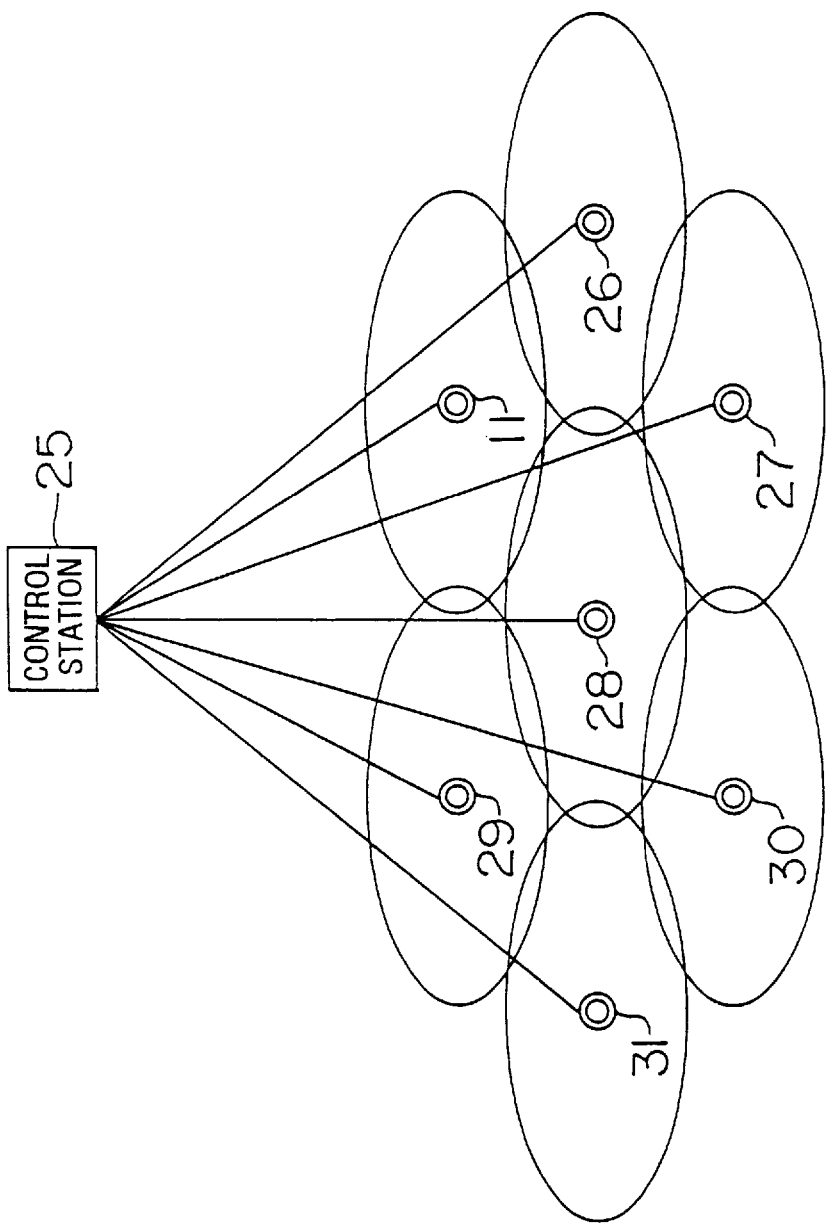
FIG. 3 is a diagram showing a relation between a control station and a plurality of base stations.

FIG. 3 shows a relation between a control station and a plurality of base stations. FIG. 3 illustrates base stations 26–31 in addition to the aforementioned base station 11, whose service zones are arranged so that they will slightly overlap with each other. The control station 25 supervises the operations of all those base stations 11 and 26–31 via cable communication networks. Although it is not explicitly shown in f3, the control station 25 is further connected to a switching system.

Figure 4:
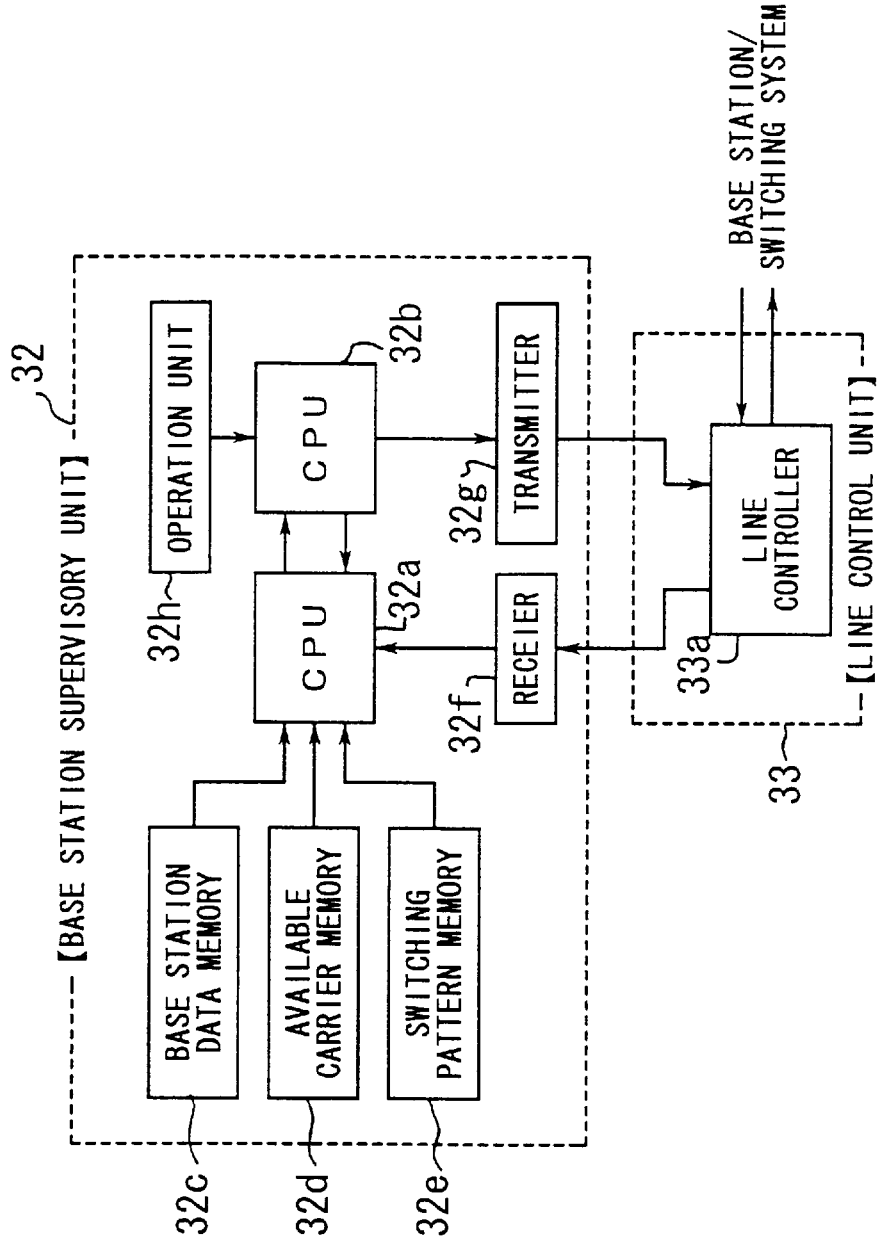
FIG. 4 is a block diagram showing the internal structure of a control station.

FIG. 4 is a block diagram showing the internal structure of the control station 25. The control station 25 consists of a base station supervisory unit 32 and a line control unit 33. This line control unit 33 provides links to the base stations and switching system through ordinary telecommunication lines.

The base station supervisory unit 32 has two CPUs 32a and 32b dedicated to carrier switching control and base station control, respectively. The CPU 32a is coupled to a base station data memory 32c, an available carrier memory 32d, a switching pattern memory 32e, and a receiver 32f, while the CPU 32b is coupled to a transmitter 32g and an operation unit 32h.

The base station data memory 32c stores carrier frequencies that are currently used in each base station. The available carrier memory 32d stores information on carriers that are available for replacement of a carrier under interference. The switching pattern memory 32e stores various combination patterns of carriers to be respectively assigned to a plurality of base stations.

The line control unit 33 contains a line controller 33a, coupled to the transmitter 32g and receiver 32f in the base station controller 32, to provide links to an exchange system (not shown) and the base stations 11 and 26–31.

Figure 5:
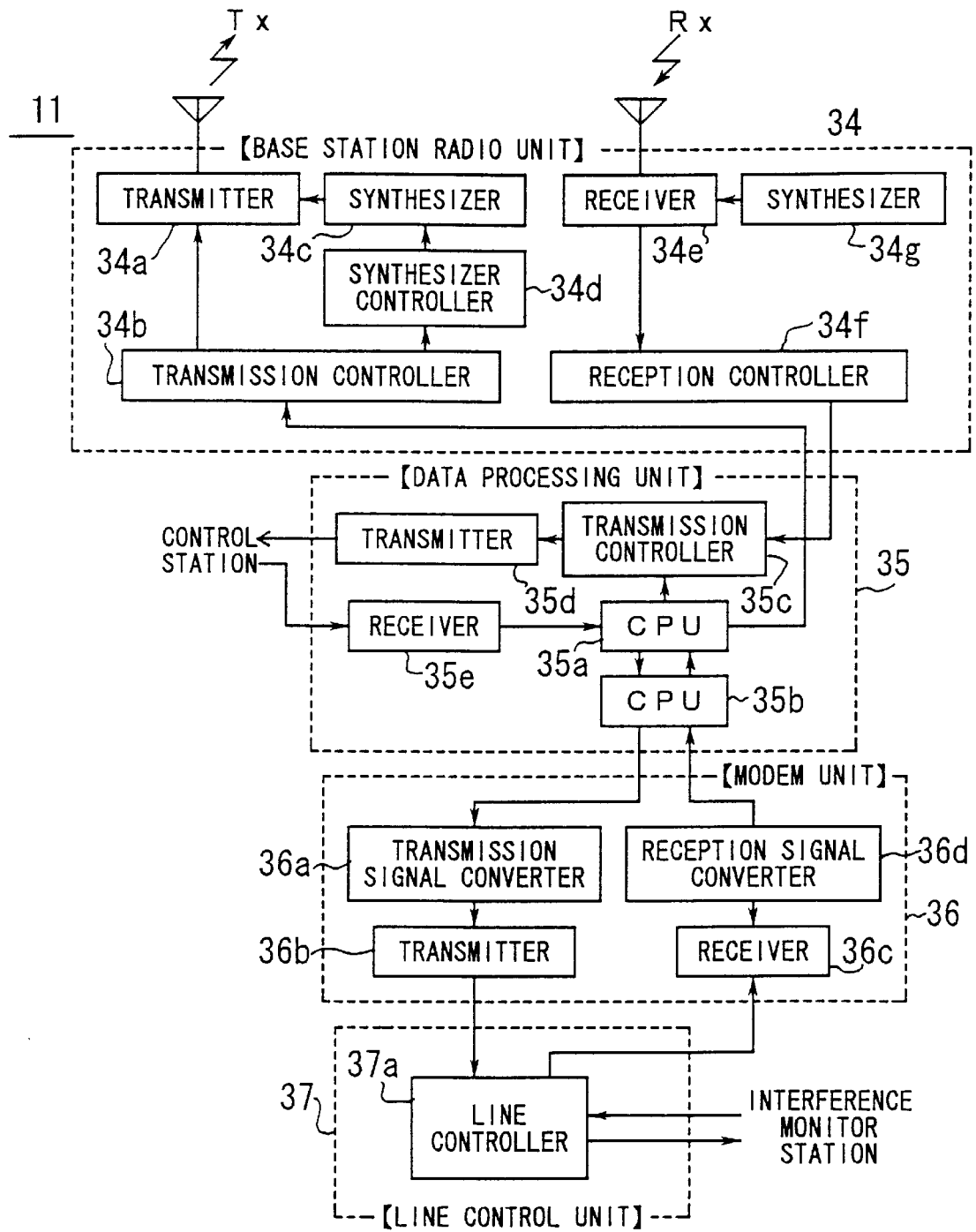
FIG. 5 is a block diagram showing the internal structure of a base station.

FIG. 5 is a block diagram showing the internal structure of the base station 11, while the other base stations 26–31 have the same structure.

The base station 11 consists of a base station radio unit 34, a data processing unit 35, a modem unit 36, and a line control unit 37. The base station radio unit 34 takes charge of signal transmission and reception using a time-division multiplexing technique. Its transmission circuit includes a transmitter 34a, a transmission controller 34b, a synthesizer 34c, and a synthesizer controller 34d, while its reception circuit includes a receiver 34e, a reception controller 34f, and a synthesizer 34g. The synthesizer controller 34d controls the frequency of a transmission carrier. The data processing unit 35 consists of two CPUs 35a and 35b, a transmission controller 35c, a transmitter 35d, and a receiver 35e. The CPU 35a controls the transmitter 35d via the transmission controller 35c, while the CPU 35b monitors the present situation of interference affecting the operations in its own service zone. The modem unit 36 is organized by a transmission signal converter 36a, a transmitter 36b, a receiver 36c, and a reception signal converter 36d. The line control unit 37 contains a line controller 37a to provide links to the interference monitor stations 12–19.

Figure 6:
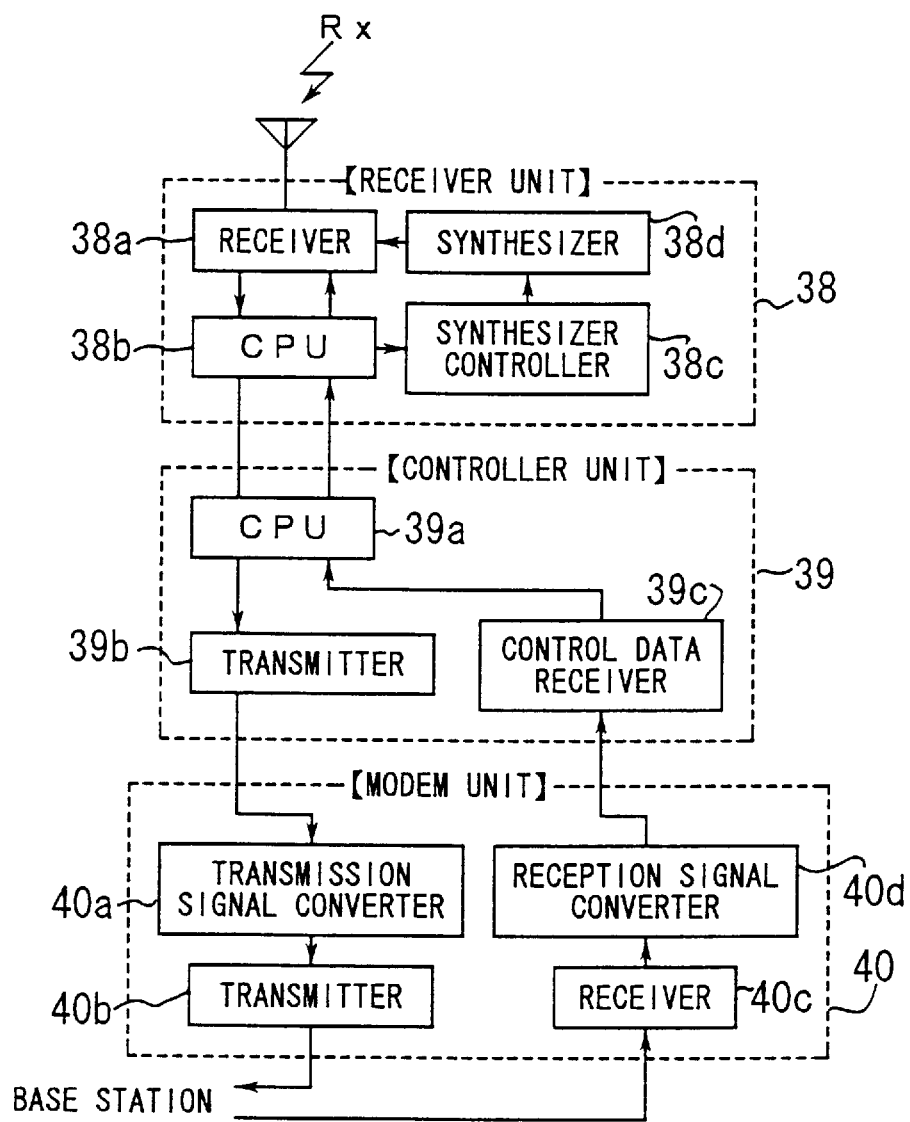
FIG. 6 is a block diagram showing the internal structure of an interference monitor station.

FIG. 6 is a block diagram showing the internal structure of an interference monitor station, which structure is common to the interference monitor stations 12–19.

The interference monitor stations are constructed with a receiver unit 38, a controller unit 39, and a modem unit 40. For detection of interference, the receiver unit 38 has a radio signal reception function equivalent to that of a mobile station. This function is provided by a combination of a receiver 38a, a CPU 38b, a synthesizer controller 38c, and a synthesizer 38d, where the CPU 38b detects color code signals. The controller unit 39 consists of a CPU 39a, a transmitter 39b, and a control data receiver 39c. The CPU 39a controls the receiver unit 38 and makes necessary decisions regarding the detection of interference. The modem unit 40 consists of a transmission signal converter 40a, a transmitter 40b, a receiver 40c, and a reception signal converter 40d.

Figure 1:
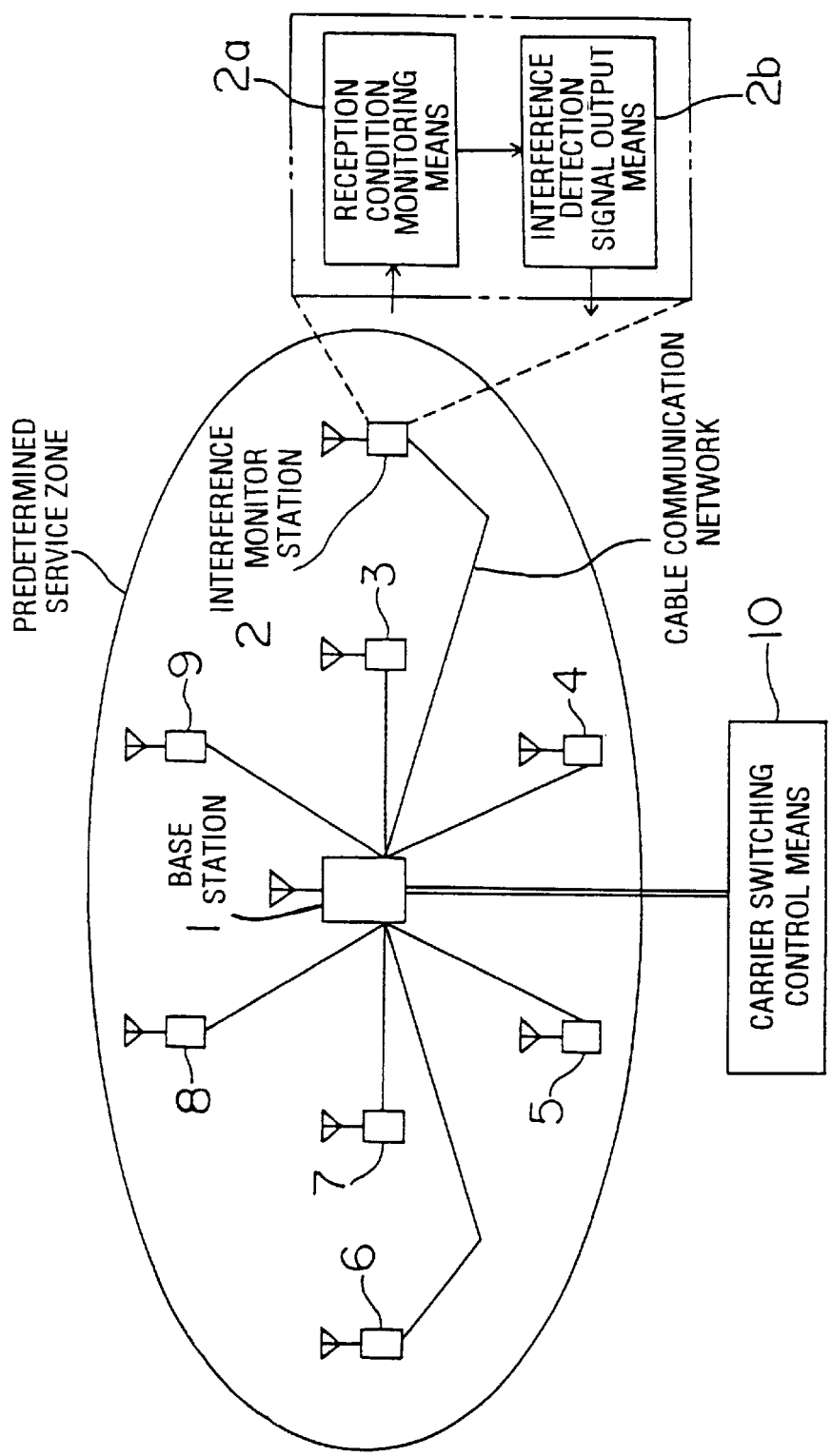
FIG. 1 is a conceptual view of the present invention.

The above-described constituents of the present embodiment all have correspondence to the basic elements shown in FIG. 1. The base station 1 in FIG. 1 corresponds to the base station 11 in FIG. 2. Similarly, the interference monitor stations 2–9 corresponds to the interference monitor stations 12–19, and the carrier switching control means 10 to the base station 11 or the control station 25. The reception condition monitoring means 2a in FIG. 1 is realized by the CPU 38b in FIG. 6 and the interference detection signal output means 2b is provided by the CPU 39a.

The operation of the above-described system will be now explained below.

In this mobile communications system, the main signals for communications between base stations and mobile stations are transmitted and/or received according to a time-division multiplexing method. Each base station can use one carrier in which 4-slot signals are multiplexed. One of the four slots is assigned to a control channel for sending control signals and the other slots are used as speech channels to convey the main signals.

Using the transmission circuit in the base station radio unit 34, the data processing unit 35 in the base station 11 constantly sends control signals over the control channel.

The receiver unit 38 in each interference monitor station receives those control signals after establishing synchronization therewith. The CPU 38b in the receiver unit 38 then extracts a color code included in the control signals. This color code is an 8-bit code inserted in the control channel slot of each frame for the purpose of interference detection. The code provides 256 data patterns, one of which is assigned to a cluster (i.e., a set of service zones defined as a unit of frequency reuse). The CPU 38b checks whether the extracted color code has any bit errors or not. When a predetermined number of color codes have been successfully received without errors, the CPU 38b concludes that there is no interference. Otherwise, the CPU 38b determines that some interference has occurred around the location of the interference monitor station.

When no interference is detected by the color code check procedure, the receiver unit 38 in the interference monitor station, immediately or after a predetermined interval, synchronizes itself again with the control signals transmitted over the control channel and begins another cycle of color code checking.

On the other hand, when the interference is detected, the receiver unit 38 sends an interference detection signal to the base station 11 via the cable communication networks (or telecommunication lines), using its controller unit 39 and modem unit 40.

In the base station 11, the data processing unit 35 receives the interference detection signal via the line control unit 37 and modem unit 36. The data processing unit 35 then discriminates which interference monitor station the interference detection signal has come from, by identifying the telecommunication line used for transmission of the signal. This discrimination may be done alternatively by checking an identification code embedded in the interference detection signal.

The data processing unit 35 further waits for more interference detection signals coming from other interference monitor stations. When the signals have arrived from a predetermined number of interference monitor stations, the data processing unit 35 sends a carrier changing request signal to the control station 25.

Before sending this carrier changing request signal, the data processing unit 35 may locate the interference monitor stations within the service zone that have raised the interference detection signals. This discrimination of locations will be done by identifying the telecommunication line used for transmission of the signal or may be done alternatively by checking an identification code previously embedded in the interference detection signal. Further, the discrimination may be done with location information (latitude, longitude, etc.) previously included in the interference detection signals. When the obtained locations agree with a predefined area, the data processing unit 35 sends the carrier changing request signal to the control station 25.

Figure 7:
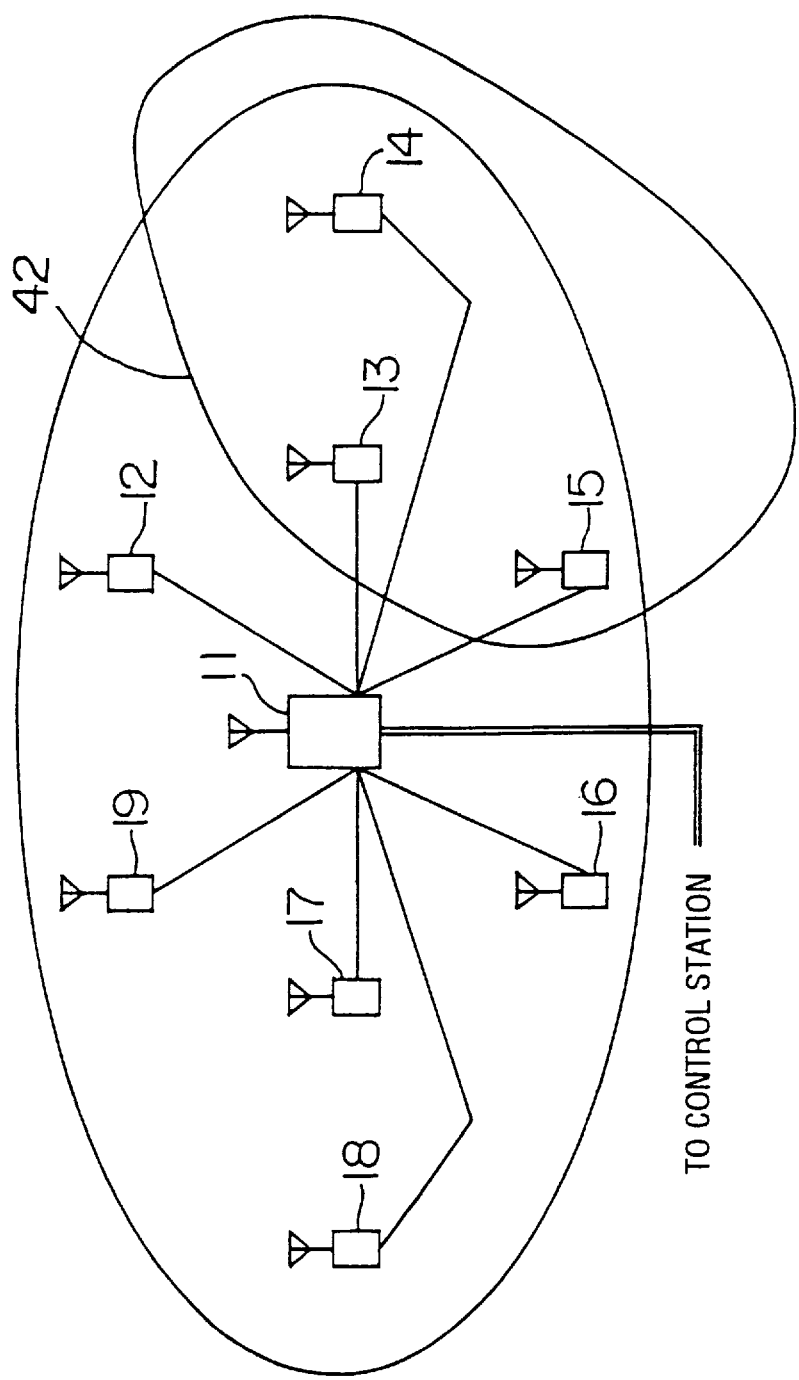
FIG. 7 is a diagram showing a situation that a plurality of interference monitor stations have detected interference.

FIG. 7 shows such a situation that the interference monitor stations 13–15 have sent the interference detection signals totally indicating the presence of interference in an area 42. When the predefined area is included in this area, the data processing unit 35 sends the carrier changing request signal to the control station 25.

The carrier changing request signal received by the line control unit 33 in the control station 25 is forwarded to the base station supervisory unit 32. The CPU 32a in the base station supervisory unit 32 identifies the base station that sent the carrier changing request signal. From the base station data memory 32c, the CPU 32a knows the carrier frequency currently used by the requesting base station and assigns another frequency as an alternative carrier for that base station.

With reference to FIGS. 8–12, the following description will focus on how the base station will switch the carrier when it is supplied with a new carrier frequency as described above.

First of all, the principle of carrier switching operation will be briefly described, where a first carrier is to be replaced with a second carrier. Note here that there must be some base stations using the speech channels of these carriers. Therefore, when a demand for the carrier switching operation has arisen, a group of mobile stations concerned with the first carrier and another group of mobile stations concerned with the second carrier are both requested to move into some other accessible carriers that have enough empty slots to accept them. The channel switching can be executed after all the slots of both carriers are cleared off.

Figure 8:
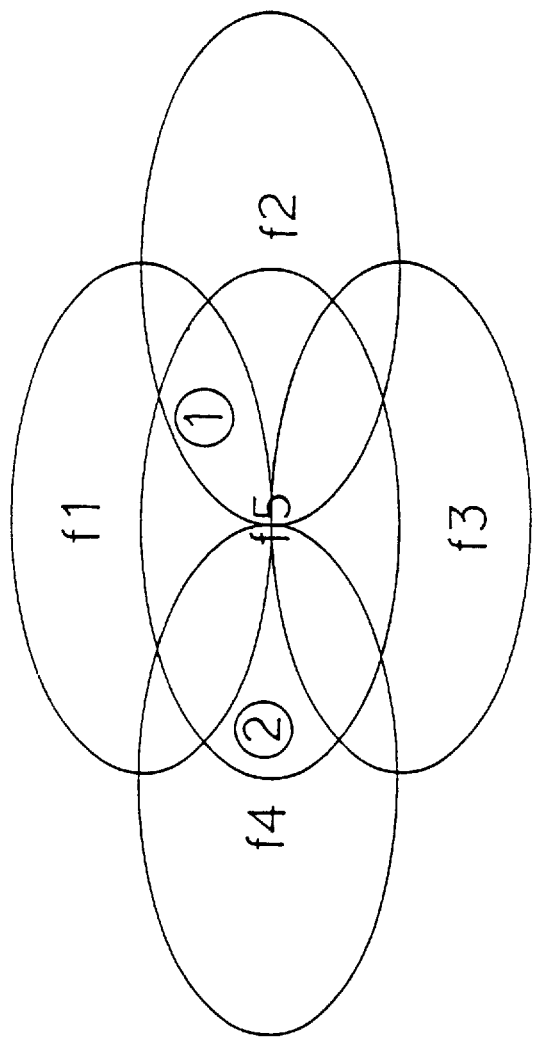
FIG. 8 is a diagram schematically showing a service zone where five carriers are available.
Figure 9:
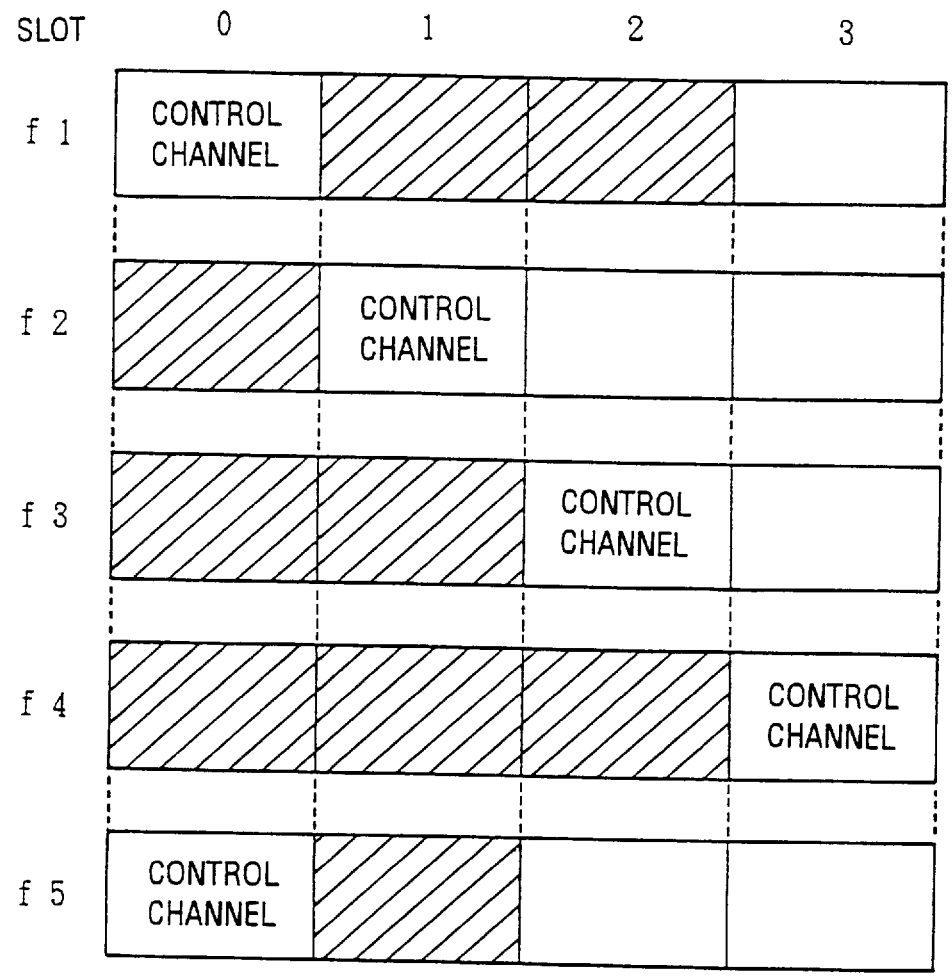
FIG. 9 is a diagram showing slot structure of five carriers.

FIG. 8 shows the structure of a service zone where five carriers are available, where the symbols f1–f5 identify the carrier assigned to each zone. It is assumed that some interference has occurred in a zone that has been using the carrier f5. FIG. 9 shows the slot structure of the five carriers. The carrier f1, for example, has the following four slots: slot #0 used as a control channel, slots #1 and #2 (hatched) used as speech channels, and slot #3 not used.

In the layout as shown in FIG. 8, even if some interference occurred in a part of the zone using the carrier f5, it would probably not affect the entire zone and thus the communications system would function without problem in the rest of the zone. Two areas ① and ② in FIG. 8 are such operational areas, where mobile stations can communicate with the base station using the control channel assigned in slot #1 of the carrier f5. The following description will study two kinds of typical cases of carrier switching operation.

The first case assumes that there are some mobile stations in the area ① and the carriers f1 and f5 are to be switched to each other. Since several slots in the carriers f1 and f5 are currently used by some mobile stations as seen in FIG. 9, the relevant base stations should request them to switch their channels to some other ones.

Figure 10:
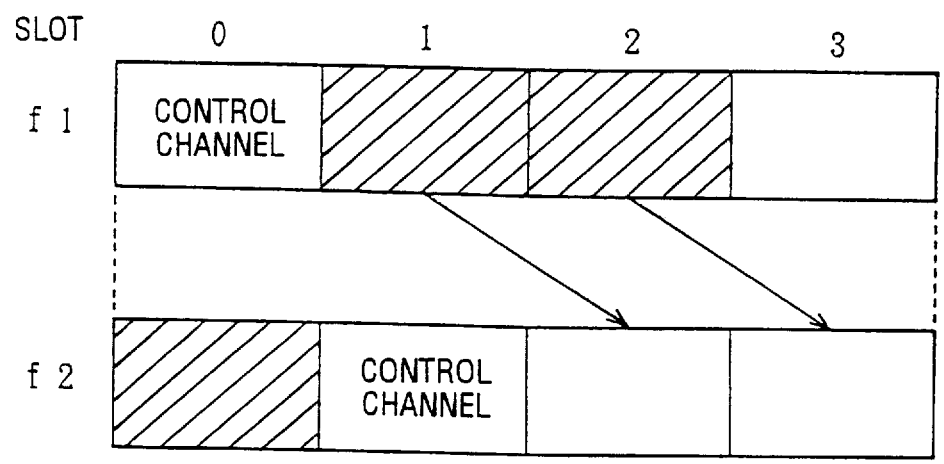
FIG. 10 is a diagram showing a channel switching operation between two carriers f1 and f2.

First, the mobile stations in operation with slots #1 and #2 of the carrier f1 are requested to move their channels to slots #2 and #3 of the carrier f2, which alternative carrier is neighboring to the original carrier and has enough empty slots therein. According to the request from the base station, the two mobile stations change their channels to the slots #2 and #3 of the carrier f2 as shown in FIG. 10, thereby clearing all the speech channel slots in the carrier f1.

Figure 11:
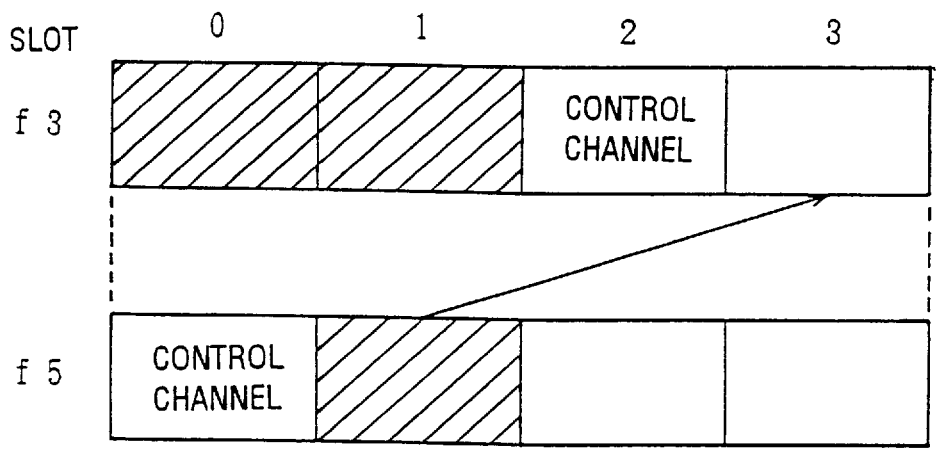
FIG. 11 is a diagram showing a channel switching operation between two carriers f3 and f5.

Then the mobile station in operation with slot #1 of the carrier f5 is requested to move its channel to slot #3 of the carrier f3, which is neighboring to the original carrier f5 and has an empty slot therein. In response to the request from the base station, the mobile station changes the channel to the slots #3 of the carrier f3 as shown in FIG. 11, thereby clearing all the speech channel slots in the carrier f5.

Figure 12:
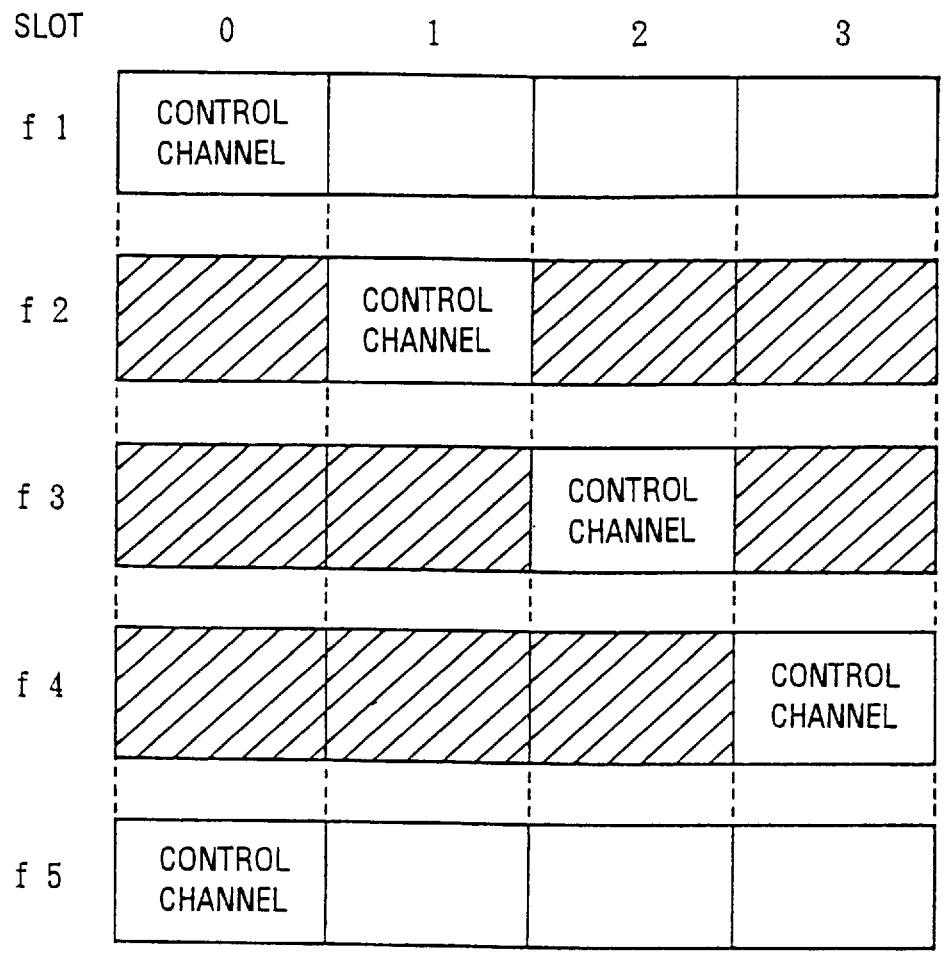
FIG. 12 is a diagram showing the slot structure of the five carriers after the channel switching operations are finished.

As a result of the above-described operations, the slots for speech channels in two carriers f1 and f5 are all cleared off as shown in FIG. 12, thus allowing the two carriers to be swapped without affecting the communication operation of the mobile stations.

Next, the second case will be explained below. Now it should be assumed that there are some mobile stations in operation in the area ② and the carrier f5 should be switched to another one. Note that this area ① overlaps with the service zone of the carrier f4. In this case, it is desirable that the active communication channel using slot #1 of the carrier f5 can be moved to somewhere in the carrier f4 for clearing off the speech channel slots in the carrier f5. Unfortunately, the slots of the carrier f4 are all occupied as shown in FIG. 9, not allowing the channel to be switched immediately.

In such a situation, the following four options are available for making the speech channel slots in the carrier f5 empty:

1) Wait for the mobile stations in the area ② to complete their operation.

2) Wait for the mobile stations in the area ② to move into other service zones (i.e., The carrier will be naturally switched to the ones for the new service zones.)

3) Wait for one of the mobile stations operating with the carrier f4 to move into another service zone using the carrier f1 or f3 and to change its channel to the new carrier. Then move the speech channel in slot #1 of the carrier f5 to the vacant slot of the carrier f4.

4) Wait for one of the mobile stations operating with the carrier f4 to complete its operation and then move the speech channel in slot #1 of the carrier f5 to the vacant slot of the carrier f4.

In the present invention, however, it is not always necessary to provide so quick carrier switching operation responsive to detection of interference. Rather, it is intended to minimize the influence of interference as much as possible. Therefore, the control station will choose and execute the most prompt way to clear off the slot #1 of the carrier f5.

After making the carrier f5 empty, the control station 25 selects one of the carriers f1–f4 that is the most likely to become empty, and the base station using that carrier requests the mobile stations in operation to change their channels. It is now assumed that the speech channel slots of a certain carrier (say, f2) have successfully become free. As a result, the carriers f2 and f5 are completely cleared off, and this makes it possible to swap the two carriers without interrupting communication operations of the mobile stations.

Incidentally, in the above-described carrier switching operations, the control station is in charge of assignment of new frequencies to the relevant base stations, and the base stations actually switch their respective carriers according to the instruction from the control station. With the cable communication networks, information about the new frequency assignment is also distributed to all the interference monitor stations under the base stations concerned.

The carrier switching operations sometimes affect the color code to be sent from the base stations. In such a case, the interference monitor stations tries to detect every incoming color code. After having received a prescribed number of instances of the same code, the interference monitor stations will recognize it as the updated color code.

Next, the following description will present several methods of assigning the carriers by the control station 25 to deal with interference.

Figure 13:
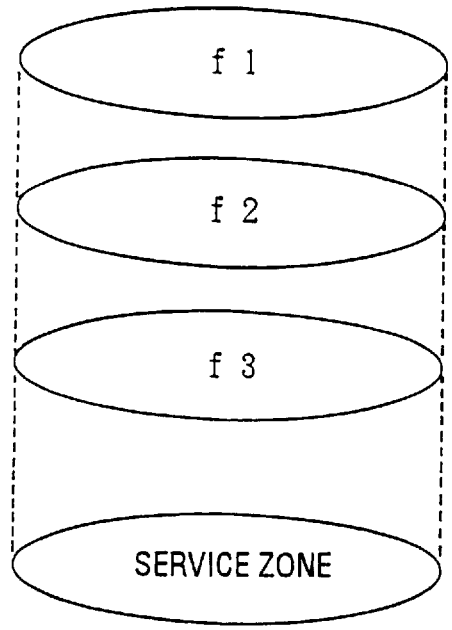
FIG. 13 is a diagram showing a relation between a base station and carriers assigned thereto in the case that multiple carriers are assigned to a single base station.
Figure 14:
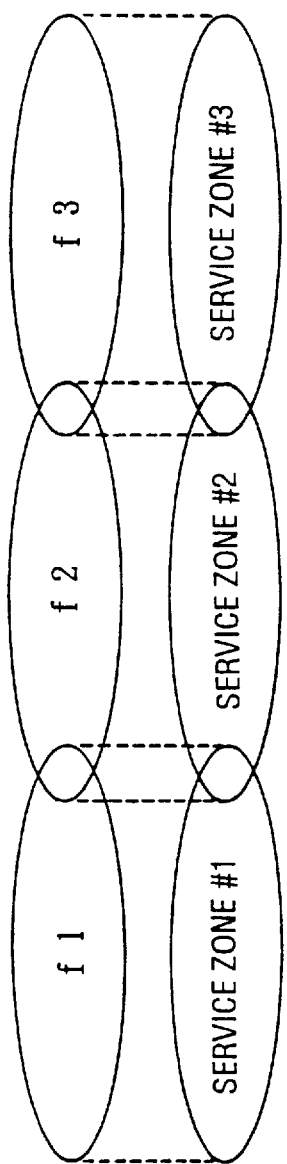
FIG. 14 is a diagram showing a relation between base stations and carriers assigned thereto in the case that a single carrier is assigned to each of multiple base stations.
Figure 15:
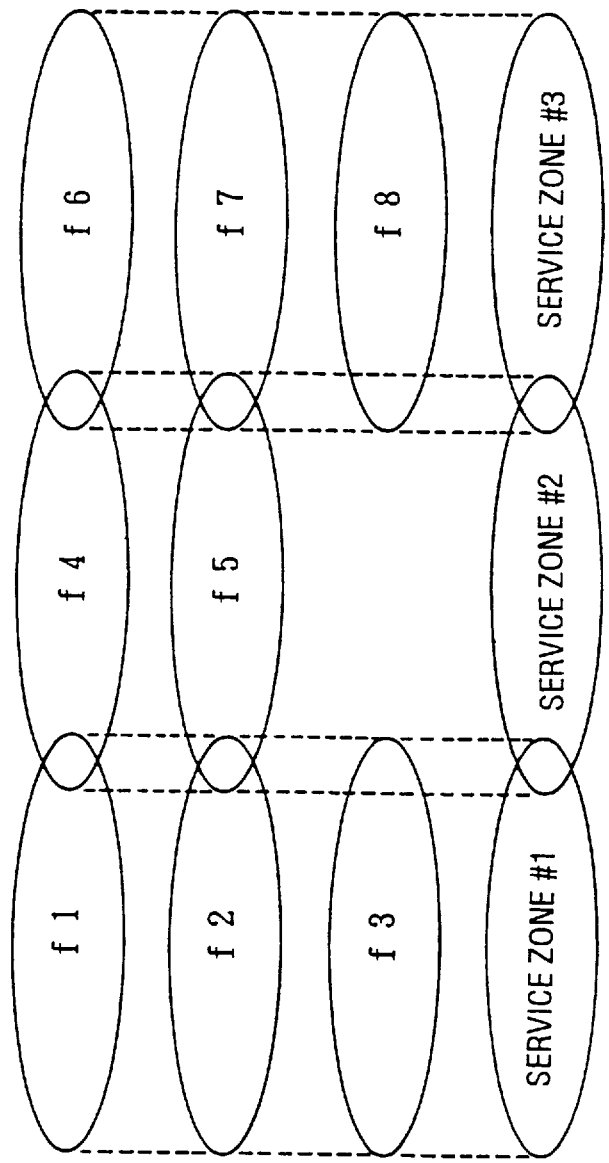
FIG. 15 is a diagram showing a relation between base stations and carriers assigned thereto in the case that multiple carriers are assigned to each of multiple base stations.

FIGS. 13–15 illustrate a relation between a base station and carriers assigned thereto. More specifically, FIG. 13 shows the case that multiple carriers are assigned to a single base station; FIG. 14 shows the case that a single carrier is assigned to each of multiple base stations; FIG. 15 shows the case that multiple carriers are assigned to each of multiple base stations.

The system shown in FIG. 13 normally operates with only one carrier, however, it is also allowed to use other frequencies prepared as spare carriers in case of interference. For example, when the system suffers from interference while using the carrier f1, it can replace the carrier f1 with another carrier f2 or f3. This type of carrier swapping operation within the same zone is called "vertical carrier rearrangement."

On the other hand, in the system shown in FIG. 14, when the carrier f1 is interfered somewhere in the service zone #1, the carrier f1 under interference will be replaced with the carrier f2 or f3 in the zone #2 or #3 which is out of the range of the interference. The carrier f1 can be then reused in the zone that has devoted its original carrier for the replacement (i.e., the zone #2 or #3). Alternatively, the carriers used in these three zones can be rotated in such a way as: moving the carrier f2 to the zone #1, moving the carrier f3 to the zone #2, and moving the carrier f1 to the zone #3. As another alternative method, the carriers can be swapped at random, or shuffled, among the three zones. These types of carrier swapping operations among the different zones are totally called "horizontal carrier rearrangement."

In the above-described vertical carrier rearrangement, the same frequency may be used in separated service zones for the purpose of efficient use of a limited frequency band. A plurality of different carrier arrangement patterns are previously prepared so that each pattern will contain different frequencies selected and combined in consideration of interference avoidance.

These carrier arrangement patterns may be also applied to a mobile radio communications system where the vertical carrier rearrangement is not applicable. In such a system, one of the patterns will be used to assign carriers to a plurality of service zones in the system, thus enabling the horizontal carrier rearrangement.

Take the system shown in FIG. 15 for instance, and assume that the carrier f4 in the service zone #2 suffers from interference. To solve the problem, a vertical carrier rearrangement between the carriers f4 and f5 (i.e., carrier swapping within the same zone) should be first investigated. If this vertical carrier rearrangement is not feasible, then a horizontal carrier rearrangement will be investigated, involving either zone #1 or #3.

Figure 16:
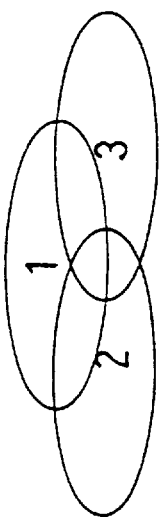
FIG. 16(A) is a diagram showing the first cluster in the case that six carriers, having different frequencies assigned to a service provider, are divided into two units for frequency reuse.
FIG. 16(B) is a diagram showing the second cluster in the case that six carriers, having different frequencies assigned to a service provider, are divided into two units for frequency reuse.
Figure 16:
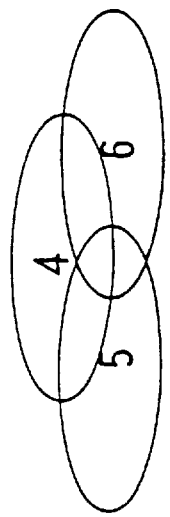

Next, another method of carrier assignment taking frequency reuse into consideration will be explained below with reference to FIGS. 16–18.

For the purpose of efficient use of limited frequency resources, the concept of frequency reuse is widely accepted. That is, the same frequency is reused in separated service zones. FIGS. 16(A) and 16(B) illustrate two sets of service zones each defined as a unit of frequency reuse (or a cluster), where six carriers are available, having different frequencies as indicated by carrier numbers 1–6.

Figure 17:
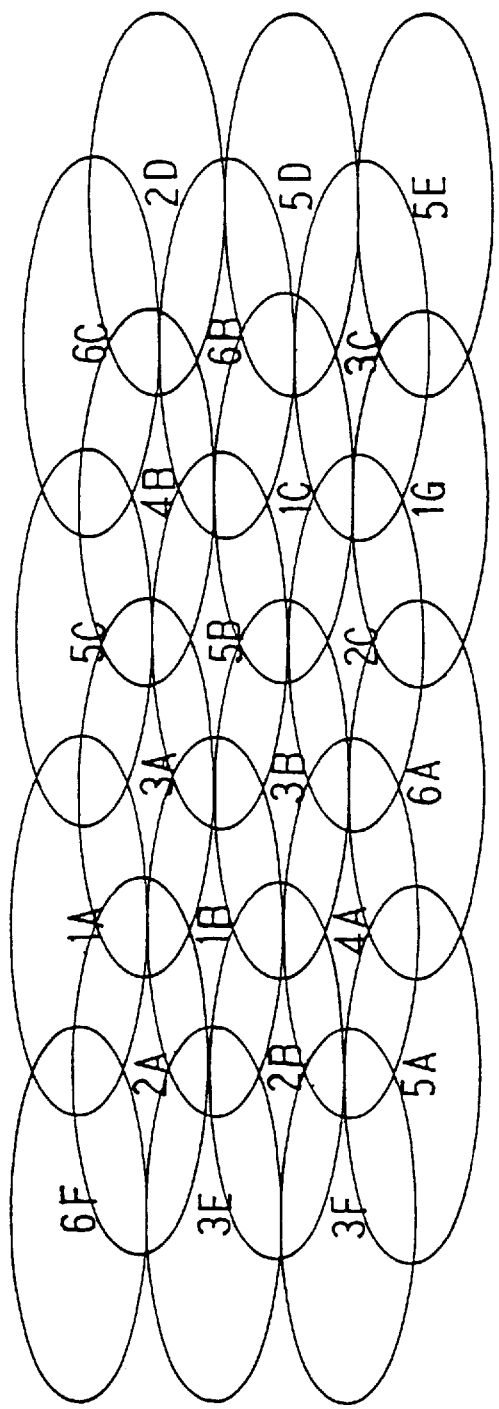
FIG. 17 is a diagram showing a wide coverage area organized by two types of clusters.

By repetitively combining these two clusters, a wide coverage area is constructed as shown in FIG. 17. The numerals 1–6 in FIG. 17 indicate the carrier numbers and the alphabetic suffixes A–F are added thereto to distinguish the clusters. Then the combinations of the numerals and suffixes will totally identify the service zones. For example, the zones 1A and 3A belong to the same cluster but use different frequencies, while the zones 5B and 5D belong to different clusters but share the same carrier frequency.

It is now assumed that the zone 5B in FIG. 17 is under interference. Obviously, the zone 5B overlaps with the following six zones: 3A, 4B, 1B, 3B, 1C, and 6B. From the viewpoint of carrier arrangement, the above situation is interpreted as that the carriers #1, #3, #4, and #6 overlap with the carrier #5. This implies that the carrier #2 is the only carrier that can replace the carrier #5 under interference in the zone 5B.

As seen in FIG. 17, the carrier #2 never overlaps with the carrier #5 at any zones, and therefore, the carrier #2 can be always used as an alternative to the carrier #5.

Figure 18:
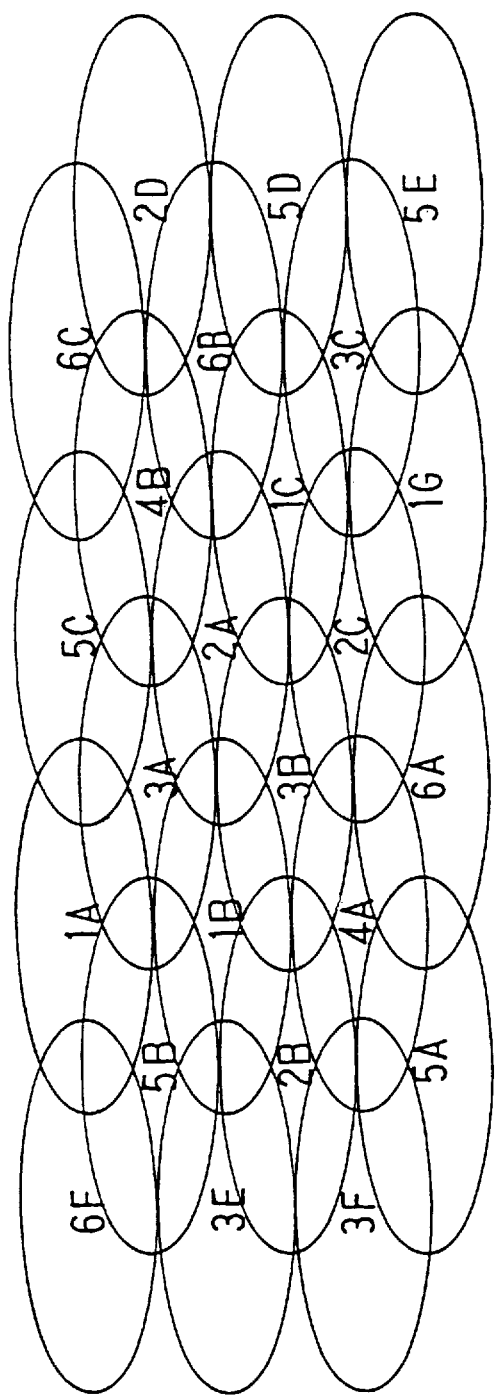
FIG. 18 is a diagram showing the area as organized as in FIG. 17 after exchanging a carrier 5 in a zone 5B and a carrier 2 in a zone 2A.

FIG. 18 shows the combined service zones after swapping the carrier #5 in the zone 5B and the carrier #2 in the zone 2A.

Incidentally, in the above-described embodiment, the base station 11 is in charge of transmission of a carrier changing request signal to the control station 25 upon reception of interference detection signals from the interference monitor stations. Alternatively, the system can be configured such that the base station 11 will simply forward the interference detection signals to the control station 25. In this case, the control station 25 will collect the interference detection signals and analyze them with regard to each base station, and then judge the necessity of carrier rearrangement.

The above discussion will be summarized as follows. According to the present invention, a plurality of interference monitor stations are disposed in the service zone of each base station and wired to the base station via cable communication networks. This structural arrangement is applicable to a single-carrier system using only one carrier for communications or a multiple-carrier system with a control channel fixed to a specific channel, allowing the system to keep operational even when the signal reception conditions deteriorate.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile communications system in which mobile stations communicate through radio transmission channels, comprising:
    a service coverage area including first clusters and second clusters, each of the first and second clusters consisting of at least three service zones to which different carriers are uniquely allocated, whereby a limited number of carriers are reused in distant regions within the service coverage area;
    a base station, disposed in each service zone, which communicate with the mobile stations by using a carrier that is allocated to said each service zone,
    a plurality of interference monitor stations, disposed in each service zone, for detecting interference affecting the carrier assigned to said each service zone; and
    carrier switching control means, coupled to said plurality of interference monitor stations and activated when the interference is detected in a particular service zone that belongs to one of the first clusters, for directing the base station disposed in said particular service zone to change the carrier under the interference to another carrier being allocated to another service zone which belongs to one of the second clusters and does not overlap with said particular service zone.

2. A mobile communications system according to claim 1, each of said plurality of interference monitor stations further comprising:
    reception condition monitoring means for monitoring a transmission signal from the base station to detect interference affecting said transmission signal, and
    interference detection signal output means for sending an interference detection signal to the base station when said reception condition monitoring means has detected interference.

3. A mobile communications system according to claim 1, wherein said carrier switching control means is disposed in said each base station.

4. A mobile communications system according to claim 1, further comprising a control station coupled to the base stations via a cable communication network for totally supervising the mobile communications system,
    said carrier switching control means being disposed in said control station.

5. A mobile communications system according to claim 2, wherein
    said reception condition monitoring means monitors said transmission signal by examining whether a color code is received without errors or not, and
    said interference detection signal output means recognizes presence of interference with said transmission signal when said reception condition monitoring means failed to receive a predetermined number of instances of said color code successively without errors, and sends said interference detection signal.

6. A mobile communications system according to claim 2, wherein said interference detection signal sent by said interference detection signal output means contains an identification code of said interference monitor station concerned,
    the mobile communications system further comprising locating means for identifying said interference monitor station based on said identification code contained in said interference detection signal, and locating an interference area within the service zone affected by said interference, based on information about said identified interference monitor station.

7. A mobile communications system according to claim 2, wherein said interference detection signal output means contains location information indicative of a location of said interference monitor station concerned,
    the mobile communications system further comprising locating means for locating an interference area within the service zone affected by said interference, based on said location information contained in said interference detection signal.

8. A mobile communications system according to claim 2, further comprising locating means for identifying said interference monitor station based on a cable communication network that was used to send said interference detection signal, and locating an interference area within the service zone affected by said interference, based on information about said identified interference monitor station.

* * * * *